(12) United States Patent
Infanti

(10) Patent No.: US 7,389,128 B2
(45) Date of Patent: Jun. 17, 2008

(54) SLIM LINE BATTERY PACK

(75) Inventor: James Infanti, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/461,289

(22) Filed: Jul. 31, 2006

(65) Prior Publication Data
US 2006/0279254 A1 Dec. 14, 2006

Related U.S. Application Data

(62) Division of application No. 10/858,080, filed on Jun. 2, 2004, now Pat. No. 7,092,746.

(51) Int. Cl.
*H04M 1/00* (2006.01)
(52) U.S. Cl. .................. 455/575.1; 455/90.3; 455/573
(58) Field of Classification Search .................. 455/90, 455/90.3, 575.1; 429/65, 123
See application file for complete search history.

(56) References Cited

U.S. PATENT DOCUMENTS 6,834,917 B2 * 12/2004 Hanna ........................ 298/1 A
2002/0086647 A1 * 7/2002 Ilvonen ........................ 455/90
2003/0082441 A1 * 5/2003 Hovi et al. .................. 429/123
2003/0170531 A1 * 9/2003 Bean et al. ................... 429/65

* cited by examiner

*Primary Examiner*—Duc M. Nguyen
*Assistant Examiner*—Wayne Cai
(74) *Attorney, Agent, or Firm*—McCarthy Tétrault LLP

(57) ABSTRACT

A battery pack is configured to reduce weight, enhance battery identification, ensure proper placement of a lid retaining the battery, and facilitate battery pack removal. The battery pack has one or more cells that lack an outer coverage except for a polymer sheathing. The battery pack includes a mating notch on a terminal plate and may include a fingernail notch and/or one or more guide rails. The fingernail notch may be a single depression formed to allow a fingernail to slip onto the battery pack, may be a single depression and a ledge that are side-by-side, or may be formed of multiple ledges and/or depressions. There may be a single guide rail or multiple guide rails. Each guide rail preferably has a hollow interior section that is crossed by one or more ribs or segments.

17 Claims, 6 Drawing Sheets

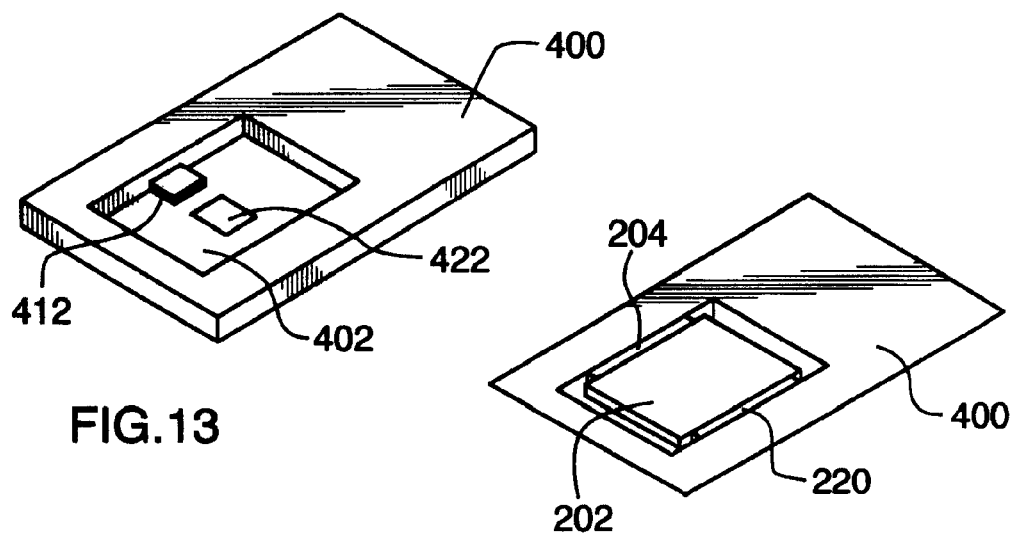
FIG.13
FIG.14
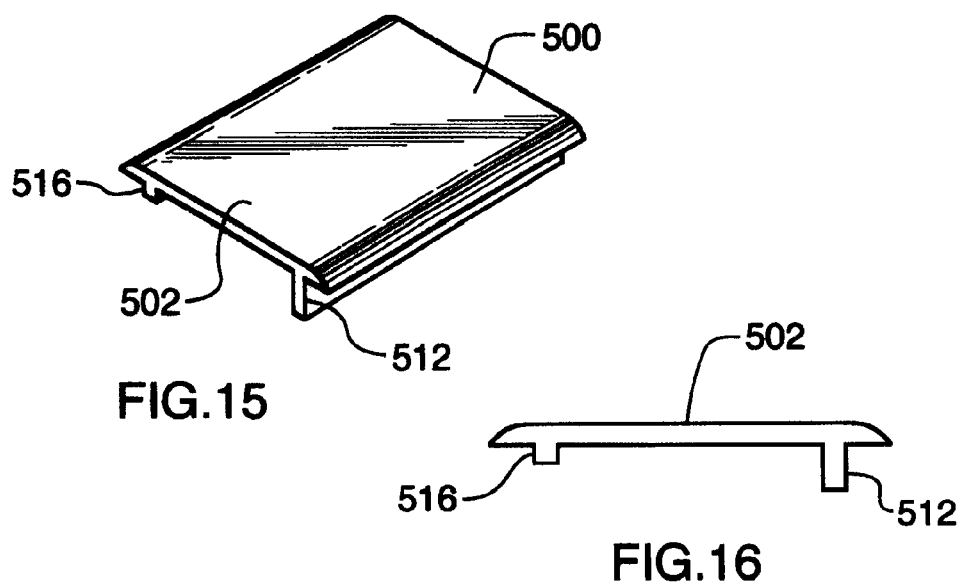
FIG.15
FIG.16
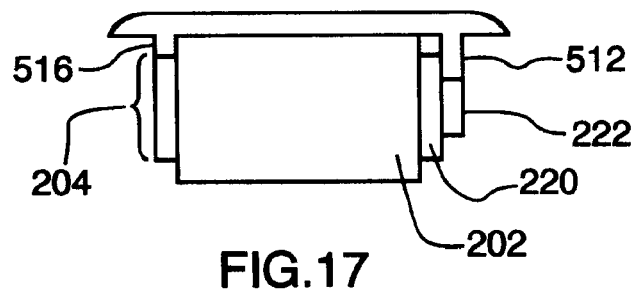
FIG.17

SLIM LINE BATTERY PACK

This application is a divisional application of U.S. patent application Ser. No. 10/858,080 filed on Jun. 2, 2004, now U.S. Pat. No. 7,092,746.

FIELD OF THE INVENTION

The present invention relates to a battery pack and, more particularly, to a battery pack used in a mobile communications device.

BACKGROUND

Current wireless handheld mobile communication devices perform a variety of functions to enable mobile professionals to stay current with information and communications, such as e-mail, corporate data and organizer information while they are away from their desks. A wireless connection to a server allows a mobile communication device to receive updates to previously received information and communications. The handheld devices optimally are lightweight, compact, and low power to facilitate usage by professionals on the go. It is desirous that the battery pack powering a handheld device be made small and compact to achieve an overall lightweight device. At the same time, it is important that the handheld device be supplied with the correct battery pack for optimal performance and to prevent damage through a physical and/or electrical mismatch. Furthermore, a battery pack needs to be properly mountable for secure placement, easy removal, and reliable contact between the battery pack power and data terminals and the handheld mobile communication device contacts. The lid covering the battery pack should be sufficiently positioned with respect to the battery pack to sufficiently retain the battery pack terminals in contact with the terminals of the mobile communication device and, optionally, spaced to avoid shocks on the lid to be transferred to the battery pack.

Therefore, it would be desirable for a battery in a mobile handheld communication device to safeguard against the placement of an improper battery and the potential resultant damage to the device; to provide a mechanical guide mechanism for a cover or door to ensure proper placement of the door when secured to the device; to provide a mechanism on the battery body to facilitate removal of the battery; to provide a thinner battery package to provide greater ease of use; and to have the connector pins properly contact the battery terminals.

SUMMARY

The battery pack of the present invention offers improvements over the prior art through a synergy of structural elements. The structural elements and their arrangement may be varied such that certain structural elements appear in one embodiment but not another. The improved battery pack arises from one or more of the following structural elements: 1) placing a notch on the bottom side of the battery aids in preventing placement of an improper battery and acts to retain the battery within the mounting compartment without unnecessary side to side movement; 2) placing guide rails (or guides) on the side of the battery opposite to the terminals, for example, the guides may be ribbed or solid and/or the guides may be molded with ribs or have the ribs removed; 3) a fingernail groove or notch that aids a user to remove the battery—instead of a single groove, there may be multiple parallel grooves in a corrugated manner—the fingernail groove may be flush with the side surface of the battery or may be indented into the battery body; 4) using the "hot melt" method of battery construction to minimize the battery pack size; and 5) the molding at one end of the pins is chamfered to facilitate full contact between the connector pin and the battery terminal.

Other aspects and features of the present invention will become apparent to those of ordinary skill in the art upon review of the following description of specific embodiments of the invention in conjunction with the accompanying figures. It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The invention will now be described, by way of example only, with reference to the accompanying drawings, in which:

FIG. 13 illustrates an embodiment of an wireless handheld communications device having a receptacle for a battery pack and a mating projection for the battery pack;

FIG. 14 illustrates the embodiment of FIG. 13 in which a battery having front and back injection moulded plastic plates is inserted into the receptacle;

FIG. 15 illustrates a perspective view of an embodiment of a lid that fits over the battery pack when seated in the receptacle;

FIG. 16 illustrates a side view of the embodiment of the lid of FIG. 15;

FIG. 17 illustrates the lid of FIG. 15 in a mounting relation to a battery pack;

DETAILED DESCRIPTION

A battery pack, preferably using a hot melt process, has a terminal side injection moulded plastic plate attached to one side and a non-terminal injection moulded plastic plate attached to the opposing side. The battery pack may be inserted in a common vertical mode in which the terminals are located upward with respect to a user holding a handheld mobile communication device in a normal manner. Alternatively, the battery pack may be inserted sideways such that the terminal side plate is considerably nearer one side of the handheld mobile communication device than the other side. A notch is preferably formed on the terminal side to mate with a mating projection of the battery pack receptacle of the handheld mobile communication device. The non-terminal plate, especially for the sideways mode, may have a structure so as to permit mating with a lid of the handheld mobile communication device. The structure may be implemented as one or more guides. These guides may have a perimeter with interconnecting ribs in accordance with limitations imposed by the hot melt process and in accordance with requirements for size, mating capability, resiliency, strength, and the like.

Figure 1:
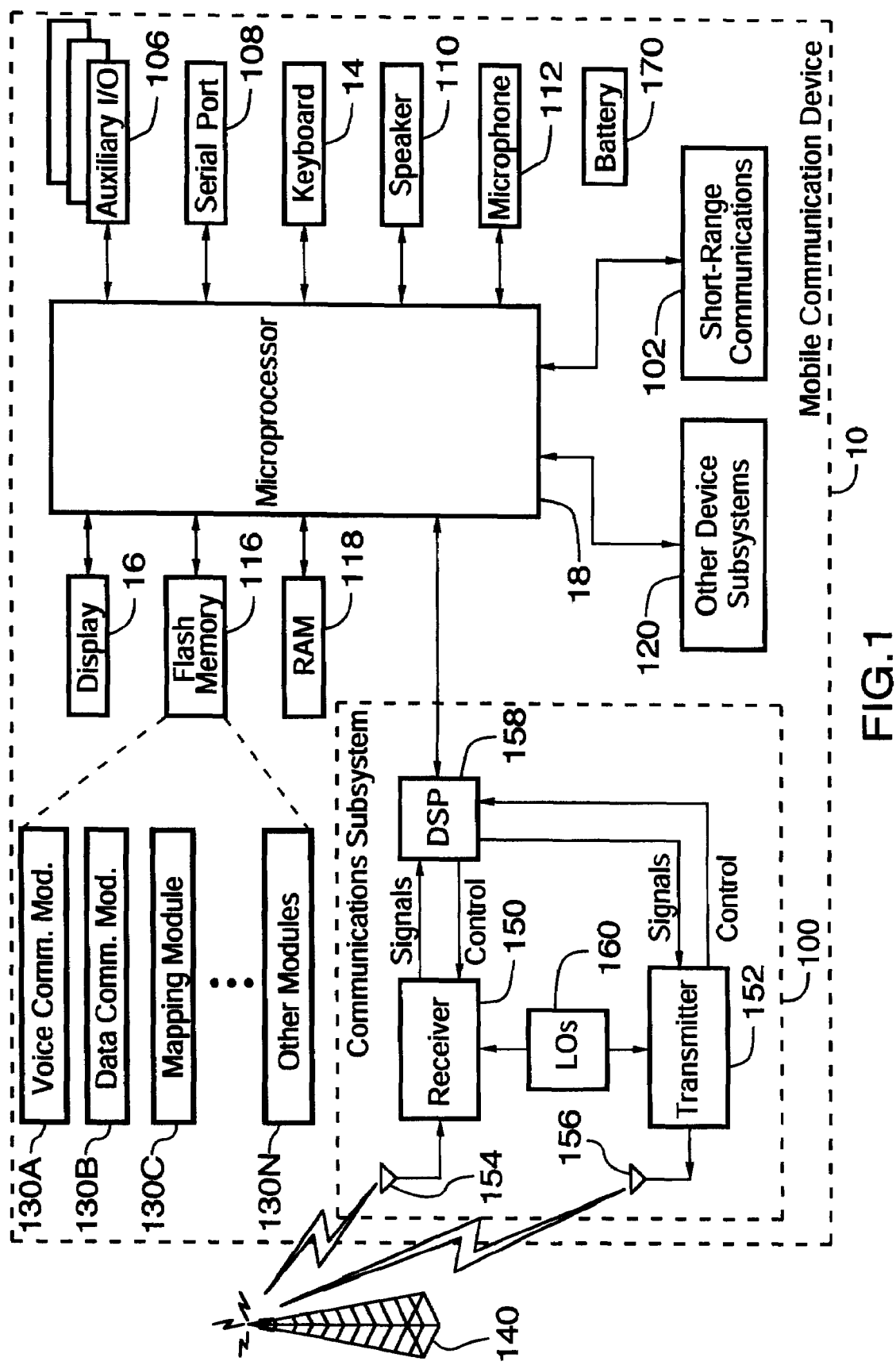
FIG. 1 illustrates a block diagram of an exemplary mobile device that uses the battery pack.
Figure 2:
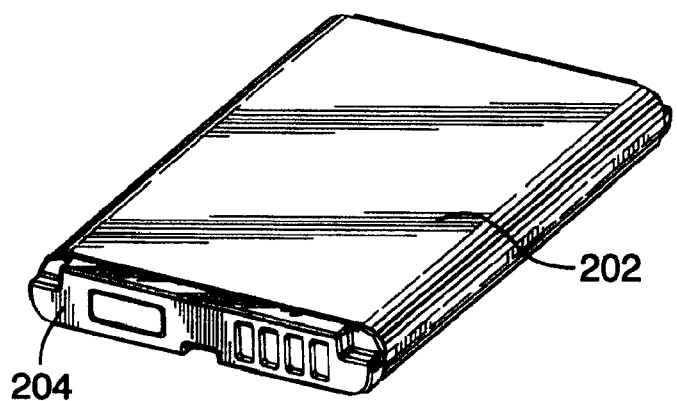
FIG. 2 illustrates a front perspective view of a first embodiment of the battery pack.
Figure 3:
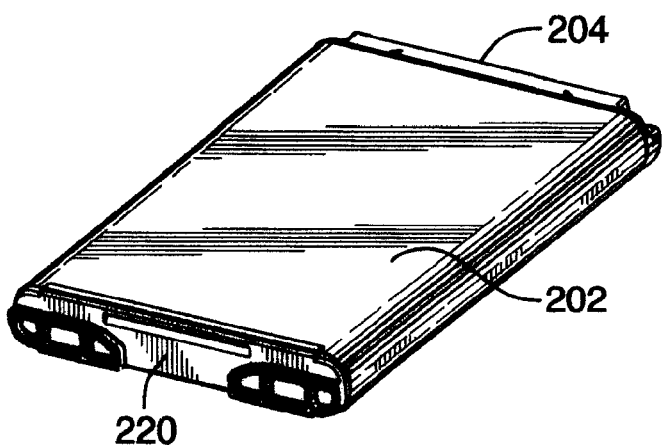
FIG. 3 illustrates a rear perspective view of the first embodiment of the battery pack.
Figure 4:
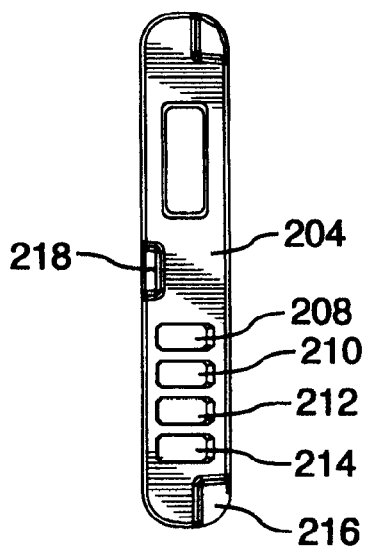
FIG. 4 illustrates a frontal view of the terminal plate in the first embodiment of the battery pack with a first embodiment of a guide.

FIG. 1 illustrates a handheld mobile communication device 10 including a housing, an input device (a keyboard 14), and an output device (a display 16), which is preferably a full graphic Liquid Crystal Display (LCD). Other types of output devices may alternatively be utilized. A processing device (a microprocessor 18) is shown schematically in FIG. 1 as coupled between the keyboard 14 and the display 16. The microprocessor 18 controls the operation of the display 16, as well as the overall operation of the mobile device 10, in response to actuation of keys on the keyboard 14 by a user.

The housing may be elongated vertically, or may take on other sizes and shapes (including clamshell housing structures). The keyboard may include a mode selection key, or other hardware or software for switching between text entry and telephony entry.

In addition to the microprocessor 18, other parts of the mobile device 10 are shown schematically in FIG. 1. These include: a communications subsystem 100; a short-range communications subsystem 102; the keyboard 14 and the display 16, along with other input/output devices including a set of auxiliary I/O devices 106, a serial port 108, a speaker 110 and a microphone 112; as well as memory devices including a flash memory 116 and a Random Access Memory (RAM) 118; and various other device subsystems 120. The mobile device 10 is preferably a two-way radio frequency (RF) communication device having voice and data communication capabilities. In addition, the mobile device 10 preferably has the capability to communicate with other computer systems via the Internet.

Operating system software executed by the microprocessor 18 is preferably stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 18, in addition to its operating system functions, enables execution of software applications on the mobile device 10. A predetermined set of software applications that control basic device operations, such as a voice communications module 130A and a data communications module 130B, may be installed on the mobile device 10 during manufacture. A cell mapping module 130C may also be installed on the mobile device 10 during manufacture, to implement aspects of the present invention. As well, additional software modules, illustrated as an other software module 130N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless network 140. Preferably, the data items managed by the PIM application are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem 102. The communication subsystem 100 includes a receiver 150, a transmitter 152 and one or more antennas, illustrated as a receive antenna 154 and a transmit antenna 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, the communication subsystem 100 of the mobile device 10 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 10.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 10 may send and receive communication signals over the communication network 140. Signals received from the communication network 140 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g., modulated and encoded) by the DSP 158 and are then provided to the transmitter 152 for digital to analog conversion, frequency up conversion, filtering, amplification and transmission to the communication network 140 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 100 and is input to the microprocessor 18. The received signal is then further processed by the microprocessor 18 for an output to the display 16, or alternatively to some other auxiliary I/O devices 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example, to display the identity of a calling party, the duration of a voice call, or other voice call related information.

The short-range communications subsystem 102 enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Powering the entire electronics of the mobile handheld communication device is a power source 170. Preferably, the power source 170 includes one or more batteries. More preferably, the power source 170 is a single battery pack, especially a rechargeable battery pack.

FIGS. 2 to 5 illustrate a first embodiment of a battery pack for use in a mobile handheld communication device. The battery pack is a stripped down (or bare) version of a cell with an added thin protective coating (e.g., a polymer or plastic coating or sheathing) that fully envelops the cell except at two ends. The terminal end is fitted through a hot melt process with a plastic plate and the non-terminal end is fitted with an injection moulded plate that serve to protect the cell and provide other functions. The hot melt process for applying the plastic plate to the cell may be through a known hot melt technique using, for example, a low temperature plastic melt. The terminal plate 204 covers and affixes a printed circuit board (not shown) that contains the terminals 208-214 that electrically connect the battery to provide power to the handheld communication device. In forming the battery pack, the non-terminal plate may be glued to one end of the cell, a printed circuit board (PCB) may be soldered on the opposing end of the cell, and then hot melt material may be injection moulded or the terminal plate may be otherwise bonded over the PCB. In one embodiment, terminal 208 is a negative power terminal, terminal 210 is a battery temperature terminal, terminal 212 is a battery identification terminal, and terminal 214 is a positive power terminal. The terminal plate may be chamfered on one, two, three, or four sides of the opening leading to the terminals 208-214. The angle of chamfer may vary between 30 and 60 degrees with respect to the major face of the terminal plate 204; more preferably, the angle of chamfer is approximately 45 degrees. Other arrangements of the terminals are clearly envisioned. On each end of the plate 204 are two side notches 216 that are useable to mate with mating projections in the receptacle of the handheld communication device such that the side notches 216 slide under the receptacle mating projections to help secure (or lock) the battery pack in the handheld communication device. The terminal plate 204 may also have a bottom notch 218 that mates with another mating projection in the receptacle of the handheld communication device. The bottom notch 218 may be a generally rectangular indentation into the terminal plate 204 or may be shaped to help uniquely identify the battery pack type. For instance, an alternative shape of the bottom notch may taper into the terminal plate 204. The tapered shape may be curved and/or trapezoidal.

Figure 5:
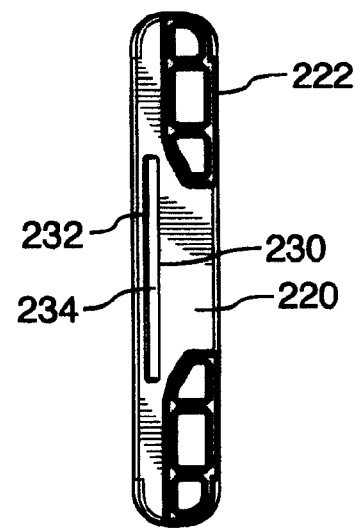
FIG. 5 illustrates a frontal view of the non-terminal plate in the first embodiment of the battery pack.
Figure 6:
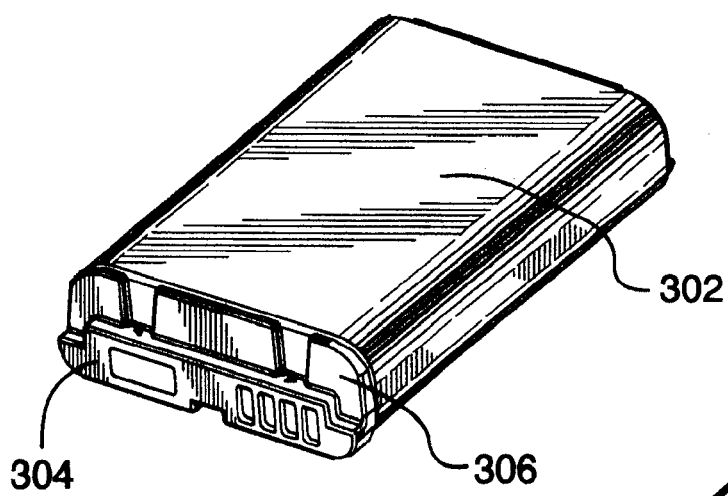
FIG. 6 illustrates a front perspective view of a second embodiment of the battery pack.
Figure 7:
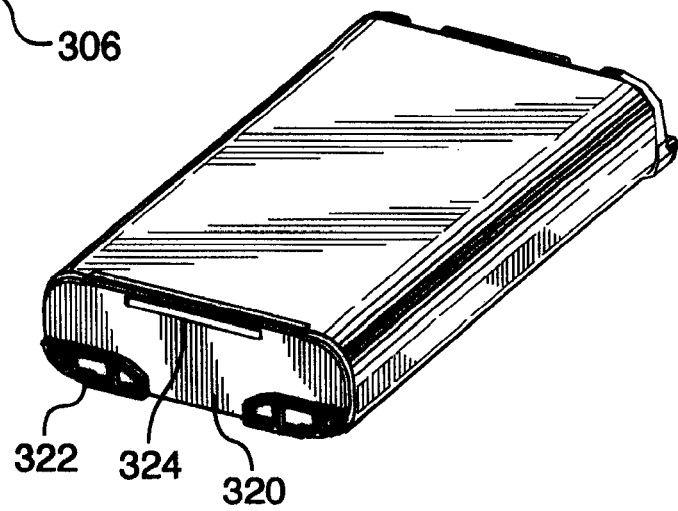
FIG. 7 illustrates a rear perspective view of the second embodiment of the battery pack.
Figures 8, 9:
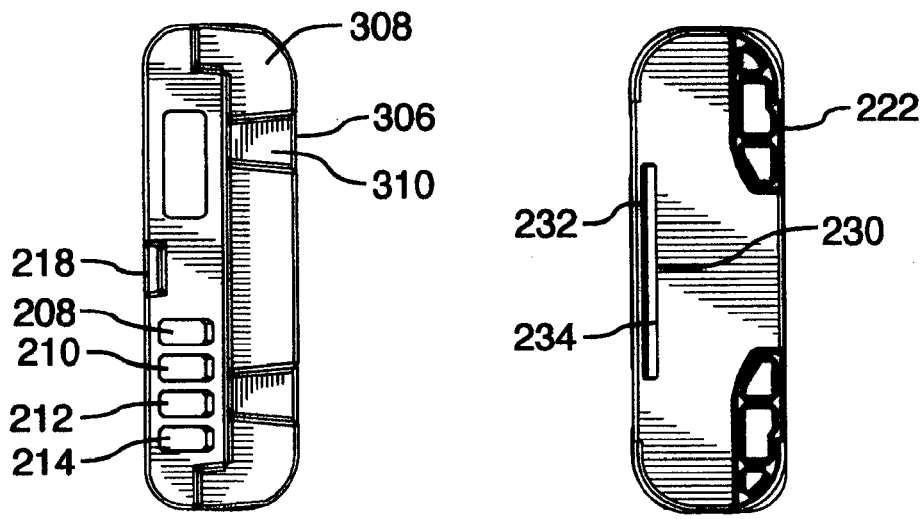
FIG. 8 illustrates a frontal view of the terminal plate in the second embodiment of the battery pack.
FIG. 9 illustrates a frontal view of the non-terminal plate in the second embodiment of the battery pack.

The dimensions of the terminal plate 204 will correspond to the size of the cell of the battery pack and may vary somewhat in relation to it. For example, the terminal plate 204 may be somewhat larger in extent than the cross section of the cell with coating to better protect the end of the cell in case of slight misalignment of the terminal plate to the end of the coated cell. Alternatively, the terminal plate 204 may be the same size as the cross section of the coated cell or may even be smaller than the cross section of the coated cell. The non-terminal plate 220 is preferably sized similarly to the terminal plate 204 or may vary in size relative to the terminal plate 204. The non-terminal plate 220 may be a single flat shaped piece of plastic that is uniformly smooth or it may contain features to facilitate removal and/or retention of a lid that fits over the receptacle. In an embodiment, the non-terminal plate 220 has a fingernail notch 230 that extends lengthwise in which a minor depression 230 is formed into the non-terminal plate and a minor ledge 232 is formed extending outward from the face of the non-terminal plate 220. There may be multiple ledges and depressions that extend at varying depths into and heights from the face of the non-terminal plate such that a curved corrugated pattern is established to facilitate placement and retention of a fingernail or fingertip in removing a battery pack from the receptacle. Alternatively or additionally, the non-terminal plate 220 may have one or more guides or guide rails 222. FIG. 5 shows two guide rails 222 in which the upper and lower portions of the perimeter are horizontal with respect to the non-terminal plate face length and with respect to the floor of the handheld mobile communication device receptacle when mounted properly. The two ends of each guide rail 222 may be curved and/or angled to provide greater operational space for a user to access a fingernail notch, to facilitate placement of the battery pack within a receptacle, to optimize manufacture, etc. In FIG. 5, each guide rail has a top horizontal portion, a curved outward portion, a bottom horizontal portion, a vertical interior portion, and a slight curved portion connecting the vertical portion to the top horizontal portion. In FIG. 5, each guide rail has two supporting ribs interior to the guide rail. The rib design strengthens the guide rail and reduces the amount of material that would otherwise be used to form a completely solid guide rail of uniform thickness. Manufacturing constraints may also factor in to favour a ribbed guide rail as relatively large unbroken areas of hot melt plastic have a tendency to form undesirable depressions.

In a particular embodiment, the entire battery pack has a range of maximal extent from the outward face of the terminal plate 204 to the outward face of the non-terminal plate 220 of from 40 mm to 70 mm. In this particular embodiment, the terminal plate maybe two to four millimeters thick and have a face that is 4 to 8 millimeters by 25 to 45 millimeters. In this particular embodiment, the face of the non-terminal plate has dimensions exactly equal to or similar to that of the terminal plate. The thickness of the non-terminal plate preferably is less than that of the terminal plate. For example, the non-terminal plate, may be 0.5 to 1.5 mm thick and have guide rails projecting outward to add an additional 0.4 to 1.0 mm to the thickness. The ribs and perimeter thicknesses of each guide rail is preferably 0.4 to 0.8 mm thick.

In a specific example, the battery pack with mounted plates may be 55±1 mm in length end-to-end, wherein the terminal plate is 34.1±0.2 mm long, 5.8±0.15 mm high, and 2.75 mm thick and the notch depths are 1.7 mm deep into the terminal base plate 204. In this specific example, the non-terminal plate is 34.1±0.2 mm long, 5.8±0.15 mm high, and 0.9 mm thick. In this specific example, the guide rails project 0.65 mm from the non-terminal plate 220, are 11.57 mm long and 3.65 mm high and have interior rib thicknesses and perimeter thicknesses of 0.69 mm. In this specific example, the guide rails are spaced from each other by a distance of 11 mm.

FIGS. 6 through 9 illustrate a second embodiment of the battery pack. The second embodiment of the battery pack is a high capacity battery pack having a markedly greater thickness than the first embodiment. For example, the thickness of this battery pack may range from 8 to 12 mm. In a specific example, the initial battery pack thickness is 10.8±0.15 mm and the battery pack thickness after 500 cycles is approximately 11.4 mm. Because of the battery pack thickness expansion from use (cycling), it is preferable to choose an adhesive melt that has expandability or flexibility. In this specific example, the terminal plate has a tapered thickness of 4 mm where the terminals are located and a minimal thickness of under 2 mm, whereas the non-terminal plate has a thickness of 0.8 mm with guide rails extending a further 0.9 mm from the outward face of the non-terminal plate. The fingernail notch and the guide rails are optional as in the first embodiment and are similarly dimension relative to the face of the non-terminal plate.

Figure 10:
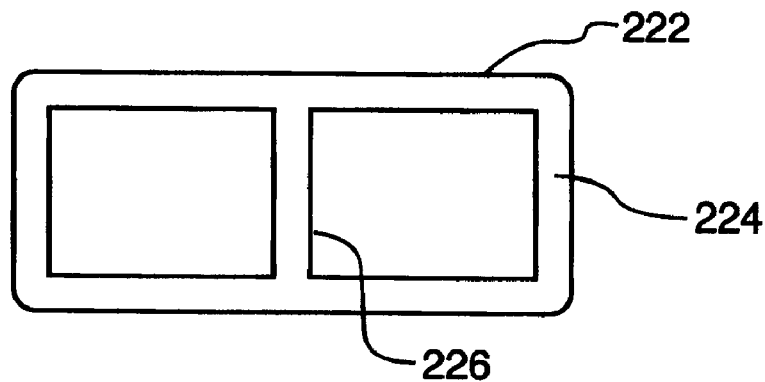
FIG. 10 illustrates a second embodiment of a guide for the non-terminal plate of a battery pack.
Figure 11:
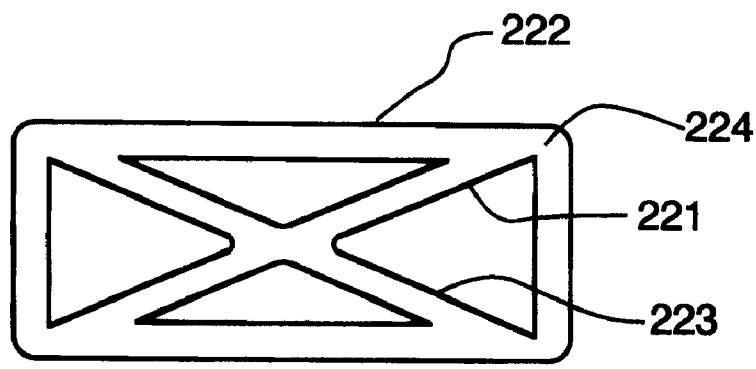
FIG. 11 illustrates a third embodiment of a guide for the non-terminal plate of a battery pack.
Figure 12:
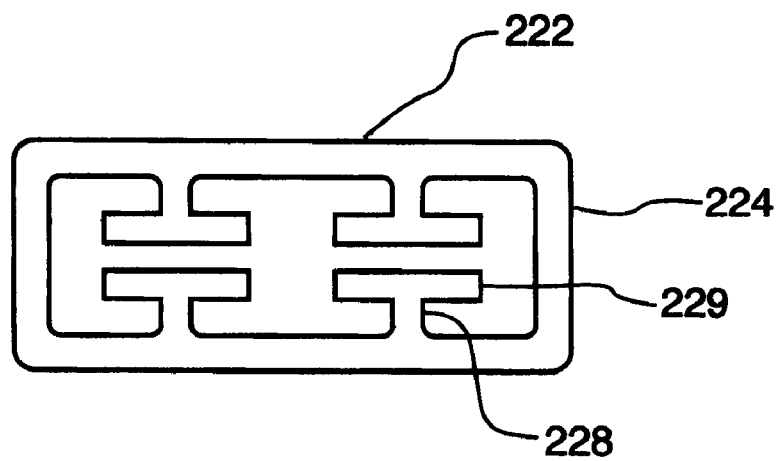
FIG. 12 illustrates a fourth embodiment of a guide for the non-terminal plate of a battery pack.

FIGS. 10 to 12 show other configurations of the guide rails of the non-terminal plate. In FIG. 10, there is only one interior rib 226 in an I-beam form. FIG. 11 shows a cross ribbed pattern. FIG. 12 shows a more complex pattern in which there are interior extensions having a vertical rectilinear segment 228 and a horizontal rectilinear segment 229 to form a T-shaped support. The T-shaped supports permit a cushioning effect when the projection from the lid is placed against the guide rail. Alternatively, in FIG. 12, the horizontal rectilinear segments of opposing supports may be shared to permit a more rigid structure and optimize processing for a particular application. In a further alternative embodiment, the guide rails may be generally of a U-shaped that is laid on its side.

FIGS. 13 and 14 illustrate a sideways mateable battery pack mounted into a receptacle of a mobile handheld communication device and the receptacle without the battery pack so mounted. In FIG. 13, a depression on the floor or base of the receptacle 402 permits mounting of a SIM card 422. A mating projection 412 is present to help prevent damage that may be caused by an improper battery pack. The mating projection may be a simple rectangular solid of specific dimensions or may be shaped to facilitate insertion, removal, and/or identification through physical mating. In FIG. 14, the battery pack is placed into the receptacle such that the terminal plate 204 is mated with the mating projection 412 and the non-terminal plate fits against or proximate to the opposite side of the receptacle.

Figure 18:
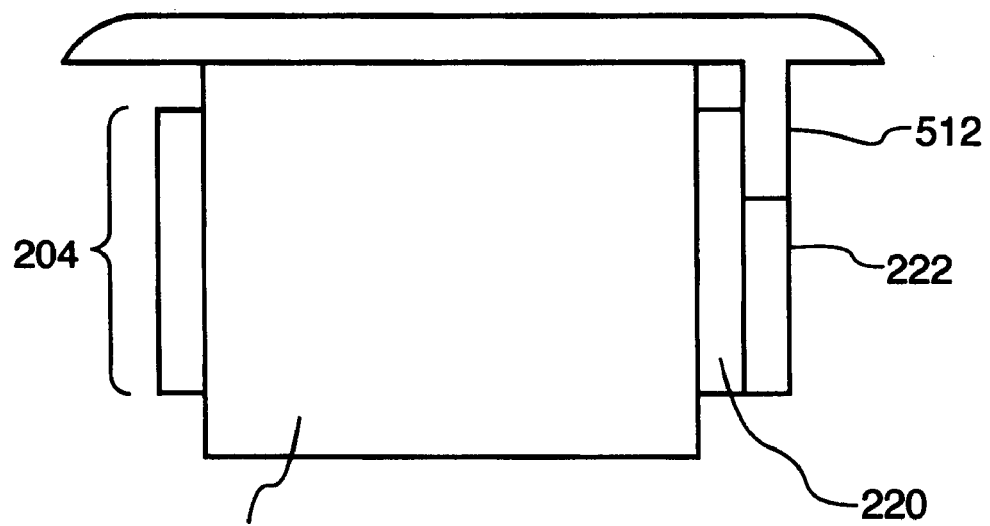
FIG. 18 illustrates another embodiment in which the lid of a mobile communications device has only one projection that overlaps a side of a battery pack.
Figure 19:
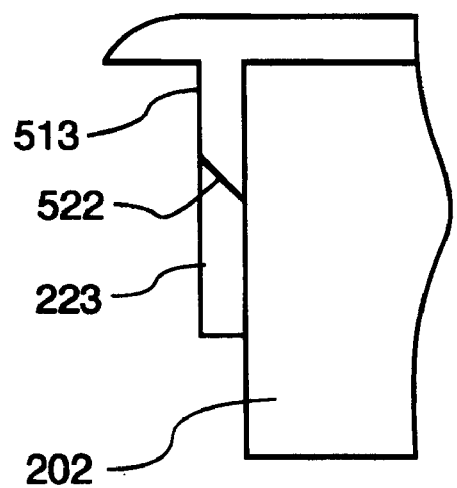
FIG. 19 illustrates a second embodiment of a projection of a lid on the non-terminal plate side of a battery pack.
Figure 20:
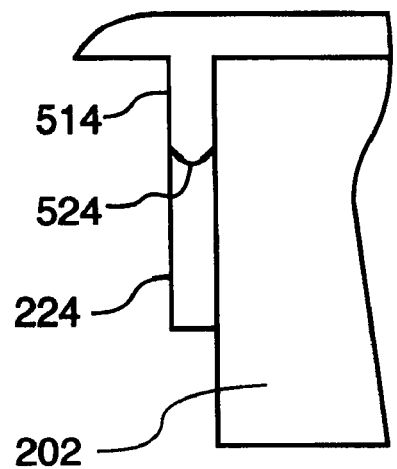
FIG. 20 illustrates a third embodiment of a projection of a lid on the non-terminal plate side of a battery pack.

FIGS. 15 to 20 illustrate the lid that covers the battery pack and is secured to the mobile handheld device. The lid 500 is secured to the handheld mobile communication device 400. Securing, for example, may be accomplished by several securing hooks on the outside edge of the lid 500 (not shown). FIG. 15 shows a lid 500 with two flanges or legs 512, 516 that extend in parallel to each other and the outside edges of the lid 500. Preferably, the flanges 512, 516 extend inward of the securing hooks. FIG. 16 shows that flange 516 is shorter than flange 512. The relative heights of the two flanges 512, 516 may vary according to the device. In certain embodiments, flange 512 may be the only flange of the lid 500, as shown in FIG. 18. As shown in FIG. 17, flange 512 rests against the guide rail 222 of non-terminal plate 220 while flange 516 rests against flange 204. Flange 512 and flange 516 maybe sized such that an air gap exists between the bottom of lid 512 and the top of the battery pack so as to provide an air pocket that is able to absorb mechanical shocks and to help channel heat away from the battery pack. The top of the terminal plate 202 or the top of the guide rail 222, 223, 224 of the non-terminal plate 220 may be structured to form other than a horizontal layer so as to better mate the lid to the housing. For example, as shown in FIG. 19, the top of the non-terminal plate 223 and the bottom of flange 513 may be tapered to form a slanted junction 522 that serves to guide the flange 513 to the end of the cell. As another example, as shown in FIG. 20, the top of the guide rail 224 of the non-terminal plate 220 may have a depression formed to mate with a flange 514 having a inverted U end portion such that they mate to form a convex/concave junction. The depression may be curved as shown or may be multi-angled such that it is formed from two or more rectilinear segments. The guide rails may be further shaped such that the outer portion of the top of guide rail 224 is turned inward to releasably retain the flange 514. Flange 514 may be structured to have an indentation to improve retention in such an arrangement.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

I claim:

1. A handheld communication device, comprising:
   a housing having a front side, a right side, a left side, and a back side;
   a display at a top portion of said front side of said housing;
   a keypad at a bottom portion of said front side of said housing;
   a battery pack having:
      a cell with a flattened cross section and two flattened ends;
      a sheath covering said cell except for said two flattened ends;
      a printed circuit board covering one of said two flattened ends;

a terminal plate covering said printed circuit board in which said terminal plate adheres said printed circuit board to said one of said two flattened ends, said terminal plate having a bottom center notch and a second notch in a top corner; and a non-terminal plate covering another of said two flattened ends, said non-terminal plate having a first guide rail protruding from said non-terminal plate;

a receptacle for said battery pack at said back side of said housing, said receptacle having a floor upon which said battery pack rests, said receptacle having a mating projection for said center notch of said terminal plate that is bounded on one side by said floor of said receptacle; and a lid for covering said receptacle, said lid having a flange protruding downwardly from its bottom side, wherein said center notch uniquely identifies said battery pack from other battery packs that are not compatible with said handheld communication device; and said center notch and mating projection, said second notch and said first guide rail, and said first guide rail and said lid collectively cooperate to align said battery pack in at least two directions in a transverse plane of said device within said receptacle when said battery is properly inserted into said receptacle and said lid is properly placed on top of said receptacle.

2. The handheld communication device of claim 1, wherein said mating projection is a rectangular solid.

3. The handheld communication device of claim 1, wherein said mating projection is tapered.

4. The handheld communication device of claim 1, wherein said notch for mating with said mating projection is a depression in said terminal plate.

5. The handheld communication device of claim 4, wherein said depression has a depth between 30% and 80% of the thickness of said terminal plate.

6. The handheld communication device of claim 5, wherein said depression has a depth approximately equal to 60% of a maximal thickness of said terminal plate.

7. The handheld communication device of claim 5, wherein said depression has a depth approximately equal to 42% of a maximal thickness of said terminal plate.

8. The handheld communication device of claim 1, wherein said non-terminal plate has a fingernail notch for facilitating removal of said battery pack and at least one guide rail that projection from an outward face of said non-terminal plate.

9. The handheld communication device of claim 8, wherein said non-terminal plate further has a second guide rail.

10. The handheld communication device of claim 9, wherein each of said first and second guide rails has a hollow interior that is at least partly crossed by a rib.

11. The handheld communication device of claim 9, wherein each of said first and second guide rails has a flat top, a flat bottom, one curved side, and one tapered side.

12. The handheld communications device of claim 9, wherein each of said first and second guide rails has a hollow interior that is crossed by two intersecting slanted ribs.

13. The handheld communications device of claim 9, wherein:

each of said first and second guide rails has an indent in its top; and an end of said flange of said lid is shaped to mate with said indent.

14. The handheld communications device of claim 9 wherein:

each of said first and second guide rails has a depression in its top; and an end of said flange of said lid is shaped to mate with said depression.

15. The handheld communications device of claim 9, wherein said lid further comprises a second flange; and a top edge of said terminal plate cooperates with said second flange to further secure said battery pack in said receptacle.

16. The handheld communications device of claim 1, wherein said battery pack is a rechargeable battery pack that is recharged within said handheld communications device.

17. The handheld communications device of claim 1, wherein said terminal plate is a hot melt plastic terminal plate and said non-terminal plate is a hot melt plastic non-terminal plate.

* * * * *